US011083142B2

(12) United States Patent
Van Gemert et al.

(10) Patent No.: US 11,083,142 B2
(45) Date of Patent: Aug. 10, 2021

(54) SYSTEM AND METHOD FOR GROWING A PLANT IN AN AT LEAST PARTLY CONDITIONED ENVIRONMENT

(75) Inventors: John Van Gemert, Berghem (NL); Martinus Kers, Tiel (NL); Gerardus Johannes Jozef Maria Meeuws, Sterksel (NL)

(73) Assignee: PLANTLAB GROEP B.V., Berghem (NL)

( * ) Notice: Subject to any disclaimer, the term of this patent is extended or adjusted under 35 U.S.C. 154(b) by 946 days.

(21) Appl. No.: 13/123,942

(22) PCT Filed: Oct. 13, 2009

(86) PCT No.: PCT/NL2009/050617
§ 371 (c)(1),
(2), (4) Date: Jul. 7, 2011

(87) PCT Pub. No.: WO2010/044662
PCT Pub. Date: Apr. 22, 2010

(65) Prior Publication Data
US 2011/0252705 A1 Oct. 20, 2011

(30) Foreign Application Priority Data
Oct. 13, 2008 (NL) .................................... 2002091

(51) Int. Cl.
*A01G 9/02* (2018.01)
*A01G 7/02* (2006.01)
(Continued)

(52) U.S. Cl.
CPC ................ *A01G 9/02* (2013.01); *A01G 7/02* (2013.01); *A01G 7/045* (2013.01); *A01G 9/24* (2013.01); *Y02P 60/14* (2015.11)

(58) Field of Classification Search
USPC ............... 47/66.7, 17, 18, 88, 65.5, 58.1 LS, 47/58.1 SC, 58.1 R, DIG. 6, DIG. 10,
(Continued)

(56) References Cited

U.S. PATENT DOCUMENTS 3,063,195 A 11/1962 Ravich
3,124,903 A * 3/1964 Truhan .............................. 47/17
(Continued)

FOREIGN PATENT DOCUMENTS

CN 1957668 A 5/2007
CN 101081001 A 12/2007
(Continued)

OTHER PUBLICATIONS

"Plants under Climatic Stress" Plant Physiol. (1971) 47, 713-718, A.). Taylor and J. A. Rowley.*
(Continued)

*Primary Examiner* — Andrea M Valenti
(74) *Attorney, Agent, or Firm* — Nixon & Vanderhye

(57) ABSTRACT

A system for growing a plant (1) in an at least partly conditioned environment includes a cultivation base (11) for receiving a culture substrate (3) with a root system (4) of the plant therein. Root temperature control elements (12) are provided which are able and adapted to impose a predetermined root temperature on the root system, and lighting elements (20,21,22) which are able and adapted to expose leaves of the plant to actinic artificial light. Leaf heating elements are also provided, which are able and adapted to impose on the leaf of the plant a leaf temperature varying from an ambient temperature. In a method for growing the plant a carbon dioxide assimilation management of a leaf system of the plant is thus influenced, and a supply of actinic light, the root temperature and the carbon dioxide assimilation management are adapted to each other.

7 Claims, 1 Drawing Sheet

(51) Int. Cl.
    *A01G 7/04*      (2006.01)
    *A01G 9/24*      (2006.01)
(58) Field of Classification Search
    USPC .................................................. 47/59 R, 62 R
    See application file for complete search history.

(56)              References Cited

U.S. PATENT DOCUMENTS

| | | | |
|---|---|---|---|
| 3,124,905 A | | 3/1964 | Stier |
| 3,314,192 A | | 4/1967 | Park |
| 3,624,380 A | * | 11/1971 | Davis ............................ 362/149 |
| 4,163,342 A | * | 8/1979 | Fogg et al. ................ 47/58.1 R |
| 4,291,674 A | * | 9/1981 | Comte et al. ................. 126/592 |
| 4,309,843 A | * | 1/1982 | Kato ................................ 47/18 |
| 4,493,163 A | | 1/1985 | De Monbrison |
| 4,543,744 A | * | 10/1985 | Royster ............................ 47/17 |
| RE32,808 E | * | 12/1988 | Wingerden ....................... 47/85 |
| 5,009,029 A | | 4/1991 | Wittlin |
| 5,117,580 A | * | 6/1992 | Brown ............................... 47/9 |
| 5,174,793 A | | 12/1992 | Ikeda et al. |
| 5,269,012 A | | 12/1993 | Nakajima |
| 5,269,093 A | * | 12/1993 | Horaguchi et al. ......... 47/58.1 R |
| 5,283,974 A | | 2/1994 | Graf, Jr. |
| 5,323,567 A | | 6/1994 | Nakayama et al. |
| 6,105,309 A | | 8/2000 | Takayanagi |
| 6,725,598 B2 | | 4/2004 | Yoneda et al. |
| 7,472,513 B2 | * | 1/2009 | Bula ................................ 47/89 |
| 7,617,057 B2 | * | 11/2009 | May et al. ....................... 702/62 |
| 8,061,080 B2 | * | 11/2011 | Loebl et al. ............. 47/58.1 LS |
| 2001/0047618 A1 | * | 12/2001 | Fang et al. ...................... 47/65.5 |
| 2003/0005626 A1 | | 1/2003 | Yoneda et al. |
| 2007/0260400 A1 | * | 11/2007 | Morag et al. ..................... 702/1 |
| 2008/0216398 A1 | | 9/2008 | Townsley |
| 2008/0302004 A1 | * | 12/2008 | Lin .......................... 47/58.1 LS |
| 2009/0025287 A1 | * | 1/2009 | Lee .................................. 47/17 |

FOREIGN PATENT DOCUMENTS

| | | | | |
|---|---|---|---|---|
| CN | 101268750 A | | 9/2008 | |
| DE | 20 2004 007633 A | | 7/2004 | |
| EP | 1574126 A1 | | 9/2005 | |
| EP | 2 348 814 B1 | | 4/2015 | |
| GB | 1 402 261 A | | 8/1975 | |
| GB | 1402261 | * | 8/1975 | ............... A01G 9/00 |
| JP | H06090614 A | | 4/1994 | |
| JP | H10178899 A | | 7/1998 | |
| JP | 2001231376 A | | 8/2001 | |
| JP | 2004-141002 A | | 5/2004 | |
| JP | 2005-204565 A | | 8/2005 | |
| JP | 2005312444 A | | 11/2005 | |
| JP | 2006262852 A | | 10/2006 | |
| NL | 1020694 | * | 5/2002 | ............... A01G 9/24 |
| NL | 1020694 A1 | | 9/2002 | |
| TW | 421993 U | | 2/2001 | |
| WO | WO 2007/105168 | * | 9/2007 | |

OTHER PUBLICATIONS

Transpiration—Water Movement through Plants, by Tracy M. Sterling Ph.D. 2004, Department of Entomology, Plant Pathology and Weed Science New Mexico State University, retreived from internet Aug. 1, 2017 [https://www.sciencemag.org/site/feature/misc/webfeat/vis2005/show/transpiration.pdf] 10 pages.*
"Observation on the Causes of the Flow of SAP in Red Maple" by, Clark L. Stevens and Russell L Eggert, pp. 636-648, Copyrighted 1945, American Society of Plant Biologists www.plantphysiol.org.*
Journal Article, Effects of Day-to-Day Changes in Root Temperature on Leaf Conductance to Water Vapour and CO2 Assimilation Rates of *Vigna unguiculata* L. walp., by Kuppers et al, Oecologia, vol. 52, No. 1 (1982) pp. 116, retrieved interent Jan. 15, 2019; https://www.jstor.org/stable/pdf/4216581.pdf?seq=1, 3 pages.*

Temperature Effects on Root Pressure Exudation by, James W. O'Leary, Department of Botany, University of Arizona, Tuscon, Arizonal, 5 pages, 1966; retrieved from interent Aug. 5, 2019 [https://watermark.silverchair.com/30-3-419.pdf?token= AQECAHi208BE49Ooan9kkhW_Ercy7Dm3ZL_ 9Cf3qfKAc485ysgAAAmcwggJjBgkqhkiG9w0BBwa.*
'Transpiration—Water Movement through Plants', by Tracy M. Sterling, Ph.D., New Mexico State University, Department of Entomology, Plant Pathology and Weed Science,[retrieved from internet https://www.sciencemag.org/site/feature/misc/webfeat/vis2005/show/transpiration.pdf], 10 pages, 2004.*
Leaf Temperature and Internal Water Status of Wheat Grown at Different Root Temperatures, M.B. Kirkham et al, Jul. 1978, 6 pages.*
International Search Report, dated Jan. 29, 2010, from corresponding PCT application.
Linying et al., "The Heating of Irradiance on Rice Leaf Temperature and Its Influence on the Photosynthetic Rate", Quarterly Journal of Applied Meteorology, 1993, vol. 4, No. 2, pp. 12-17.
Yongcheng et al., "Root Temperature in Vegetables Production", Chinese Vegetables, Apr. 1990, Issue No. 2, pp. 49-51.
Chinese Office Action, dated Jul. 27, 2012, from corresponding Chinese application.
Mingchi Liu et al., "Effect of New Irrigating and Soil-Warming Cultivation System with Porous Ceramic Pipes on Yield and Fruit Quality of Tomato in Solar Greenhouse in Winter", Agricultural Engineering, Sep. 30, 2005, pp. 186-188, vol. 21, No. 9.
Official Action issued in U.S. Appl. No. 14/707,134, dated Jul. 30, 2018.
Observations under Article 115 EPC issued in EP Application No. 09744494.7 (EP2348814) dated Oct. 23, 2014.
Frantz, J. et al., "Exploring the Limits of Crop Productivity Beyond the Limits of Tipburn in Lettuce," J. Amer. Soc. Hort. Sci. 129(3):331-338. 2004.
Jie, H. and Kong, L., "Growth and Photosynthetic Characteristics of Lettuce (*Lactuca sativa* L.) under Fluctuating Hot Ambient Temperatures with the Manipulation of Cool Root-zone Temperature," Journal of Plant Physiology, vol. 152, p. 387-391 (1998).
Jie, H. and Kong, L., "Growth and photosynthetic responses of three aeroponically grown lettuce cultivars (*Lactuca sativa* L.) to different rootzone temperatures and growth irradiances under tropical aerial conditions," Journal of Horticultural Science & Biotechnology (1998) 73 (2) 173-180.
Kirkham, M. and Ahring, R., "Leaf Temperature and Internal Water Status of Wheat Grown at Different Root Temperatures," Agronomy Journal, vol. 70, Jul.-Aug. 1978, pp. 657-662.
Nam, S. and Yoon, Y., "Greenhouse Environment and Leaf Lettuce Cultivation During Hot Summer Season in South Korea," Proc. IS on Trop. Subtrop. Greenhouse, Acta Hort. 578, ISHS 2002, pp. 399-402.
Philips, "Growing Value: Philips GreenPower LED module HF opens up new opportunities for multilayer cultivation," Sep. 2008.
Philips, "Philips sets out vision to bring benefits of LED lighting to horticulture," Oct. 13, 2008, http://www.newscenter.philips.com/main/lighting/news/press/2008/horti_fair.wpd.
Schnelle, M. et al., "The Hobby Greenhouse: OSU Extension Facts No. 6705," Cooperative Extension Service, Division of Agriculture, Oklahoma State University.
Thompson, H. et al., "Shoot and Root Temperature Effects on Lettuce Growth in a Floating Hydroponic System," J. Amer. Soc. Hort. Sci. 123(3):361-364, 1998.
Meinen, E. et al., "Growth and development of chrysanthemums grown under SON-T lighting and under LED lighting," Wageningenur UR Greenhouse Horticulture, Wagenigen, Dec. 2009, Report 315 (partial English machine translation provided).
Onder, "Rootco heat exchangers make the root climate in substrates more manageable. Applied under cultivation gutters, cultivation tables or floor," (partial English machine translation provided).
Matsui, T. and Eguchi, H., "Effects of Environmental Factors on Leaf Temperature in a Temperature Controlled Room," Environ. Control in Biol. vol. 8, No. 2, 1971.

(56) References Cited

OTHER PUBLICATIONS

Vogelezang, J.V.M. ,"Effect of Root-Zone Heating on Growth, Flowering and Keeping Quality of Saintpaulia," ScientiaHorticulturae, 34 (1988) 101-113.

* cited by examiner

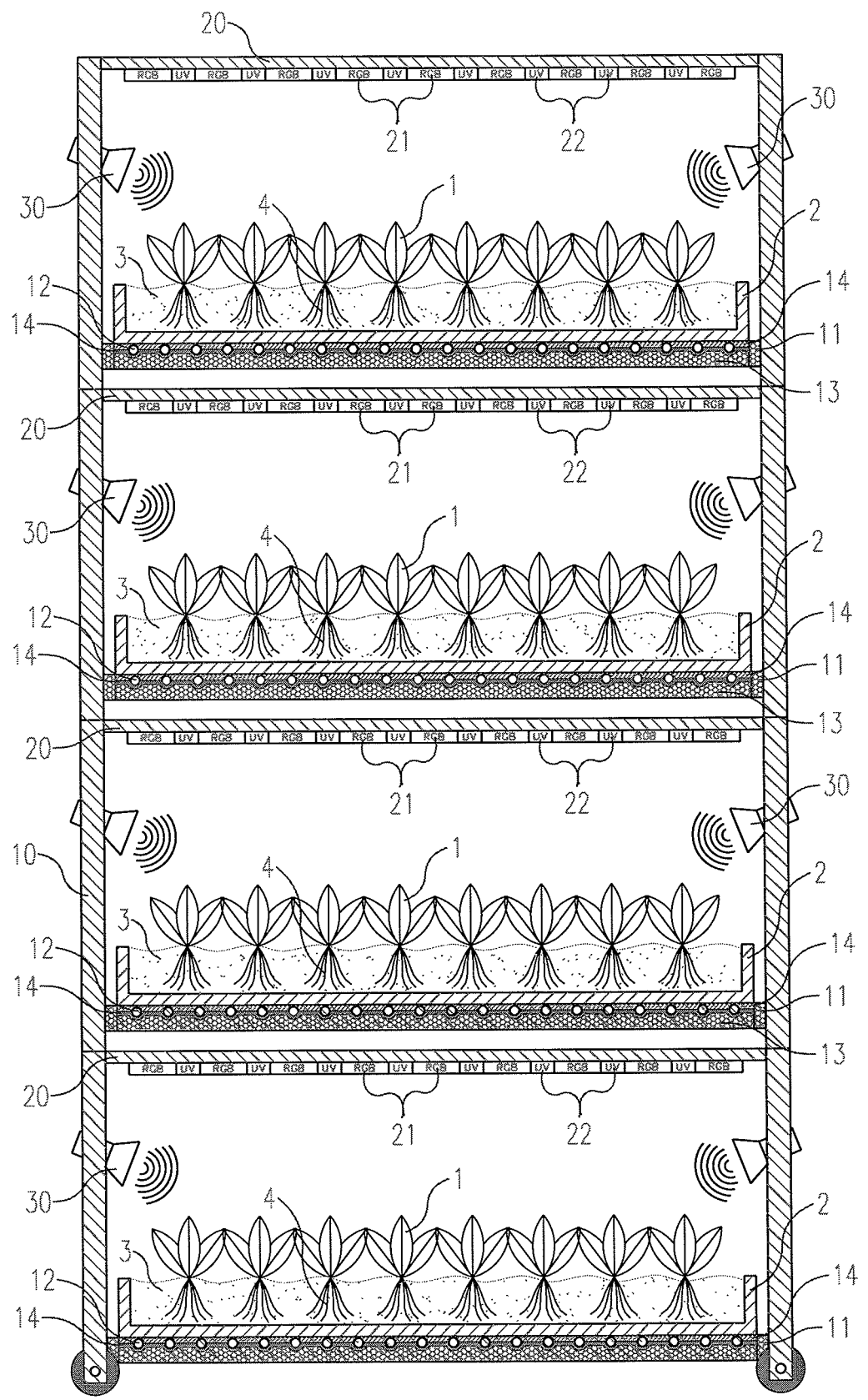

SYSTEM AND METHOD FOR GROWING A PLANT IN AN AT LEAST PARTLY CONDITIONED ENVIRONMENT

BACKGROUND OF THE INVENTION

Field Of The Invention

The present invention relates to a system for growing a plant in an at least partly conditioned environment, comprising a cultivation base for receiving a culture substrate with a root system of the plant therein, root temperature control means which are able and adapted to impose a predetermined root temperature on the root system, and comprising lighting means which are able and adapted to expose leaves of the plant to actinic artificial light. The invention moreover relates to a method for growing a plant in at least partly conditioned manner, wherein actinic light is supplied to the plant and wherein a root temperature of a root system of the plant is maintained at a desired value.

Description Of The Related Art

Such a system and such a method are applied on a significant scale in the glass horticulture in greenhouses. An artificial climate is created here in an at least substantially closed and conditioned environment behind glass, and is adapted as far as possible to the optimal growth conditions of the plant for cultivating. It is hereby possible to grow plants in areas and seasons in which the plant would not survive outdoors, or would at least not reach full development. Furthermore, the production of the plant can thus be precisely adapted to a desired harvesting time. It is thus possible to estimate relatively precisely beforehand how much of which plant will be ready, and when. If desired, the same product can moreover be grown throughout the year and plants and flowers at all stages of life can be cultivated.

In traditional glass horticulture sunlight is applied as the main source of actinic light, i.e. optionally visible light of a wavelength such that a plant response is thereby initiated or influenced, such as a photosynthesis in the leaf or a determined mode of growth. Sunlight moreover provides heat in the form of infrared radiation, whereby an increased air temperature can be maintained in greenhouses relative to an outside temperature. In the absence of sunlight, such as particularly at night, heating is possible in order to maintain such an increased air temperature, while excessive entry of sunlight can be prevented during the day by means of partial blinding and filtering, and the climate can also be regulated by means of ventilation. All in all, a climate in a greenhouse can thus be controlled within certain limits and can be adapted to a desired growth development of a plant for cultivation, which is further controlled by means of a controlled dosage of moisture and nutrients, in addition to pesticides. An additional component here is the root temperature. It has been found that the growth of the plant can be influenced by control of the root temperature. With a view hereto, root temperature control means can be provided in order to maintain a root temperature varying from the air temperature.

Classic glass horticulture does however also have drawbacks. Firstly, the environment must be particularly taken into account here. It costs energy to keep a greenhouse warm and, for some plants, lighted day and night. It is therefore important to regulate the energy management as efficiently as possible. Where greenhouses are built in or close to densely populated areas, the aspect of space is moreover an important factor. Traditional greenhouses do after all require entry of sunlight and take up a relatively large amount of expensive land area in these areas, which could otherwise be employed for offices, house-building or infrastructure. In order to address this problem, low-daylight, in particular underground, daylight-free and multi-layer solutions are being sought in order to enable multiple use of the same land area. Because not only heat but also actinic light will in such a case be supplied artificially, the energy management is even more of a problem, and there is therefore a need for a cultivation of plants which is as efficient as possible.

SUMMARY OF THE INVENTION

The present invention has for its object, among others, to provide a system and method for growing a plant in an at least partly conditioned environment which enable a further improvement in efficiency.

In order to achieve the stated object, a system has the feature according to the invention that leaf heating means are provided, which are able and adapted to impose on the leaf of the plant a leaf temperature varying from an ambient temperature. The system according to the invention thus provides the option of a controlled evaporation and carbon dioxide assimilation via the leaf by regulating a correct amount of energy on the leaf, in addition to a controlled lighting, both in respect of the amount of light and in respect of spectral ratios, with a view to plant growth reactions, such as blue/red and red/far-red ratios, and in respect of light spectra necessary for specific reactions such as pigment formation, and in addition to a control and optimization of the root pressure activity. This all takes place in an at least partly conditioned environment in which the climate can be controlled within narrow limits in respect of, among other factors, an air humidity balance, a room temperature and a carbon dioxide concentration as well as water and nutrition for the plant.

The invention is based here on the insight that three factors are essentially responsible for a successful plant development, i.e. the photosynthesis, the sap flow in the plant pushed upwards under the influence of a prevailing root pressure, and the carbon dioxide assimilation through mainly the leaf system of the plant, and that these three factors must at all times be adapted to each other in order to actually realize an optimal plant growth. In addition to the root temperature and the entry of actinic light, a carbon dioxide assimilation management of the plant can also be controlled by providing the leaf heating means in the system according to the invention. Due to additional heating the stomata in the leaf will open further, so enhancing entry of carbon dioxide to the leaf and evaporation of moisture from the leaf. This latter is particularly important if a sap flow in the plant is stimulated by an increased root temperature, as this flow will have to exit via the same stomata. Conversely, the leaf temperature can be decreased at a lower sap flow in order to prevent undesired plant dessication. All in all, the most important climate parameters responsible for the development of the plant can thus be controlled so that an optimal efficiency can be realized in each of these components with a minimal energy consumption.

A particular embodiment of the system has the feature according to the invention that the lighting means are able and adapted to emit a lighting spectrum which can be adapted to an intended photosynthesis and/or mode of growth of the plant to be cultivated. The actinic light components necessary for the development of the plant can thus be supplied only in precisely sufficient intensity, while non-actinic components or an excess can be avoided as far as possible in order to limit the overall energy consumption of the system and/or possible harmful effect on the plant development.

In a further particular embodiment the system according to the invention is characterized here in that the lighting means comprise a set of light-emitting diodes, these diodes being able and adapted to emit radiation at different wavelengths and being individually controllable, optionally in groups. Such so-called LED elements produce substantially monochromatic light and are obtainable for different wavelengths, particularly in the far-red, yellow, green and blue visible part of the spectrum. A photosynthetically active (PAR) spectrum which best suits the concrete needs of the plant can thus be constructed, and optionally modified, by combination and selection of individual LEDs.

The leaf heating means can be formed per se in various ways, although in a preferred embodiment the system according to the invention is characterized in that the leaf heating means comprise at least one heat source able and adapted to irradiate the leaf with infrared radiation. Other than heating means which, wholly or partially through guiding of an intervening medium, are capable of heat-exchanging contact with the leaf, such a heat source enters into heat-exchanging contact mainly through direct irradiation. Not only does this result in a highly effective and efficient heating of the leaf system, the intended temperature difference with the environment contributing toward a desired widening of the stomata is hereby also achieved in particularly effective manner. In a further preferred embodiment the system according to the invention is characterized here in that the lighting means and the heat source are accommodated in mutually separated fittings in order to thus exclude a possibly disruptive influence of an inevitable heat dissipation in the heat source itself from the conditioning sphere of the actinic light source.

Although the root temperature control means per se can also be realized in diverse ways, a preferred embodiment of the system according to the invention has the feature that the root temperature control means comprise a closed conduit system for receiving therein during operation a liquid flow with a controlled temperature, wherein the conduit system is able and adapted to enter into heat-exchanging contact with the culture substrate. Such a conduit system can for instance be formed by a system of tubes or fins in or under the culture substrate, in which a liquid flow meanders alternatingly. The root temperature can be uniformly controlled by thus heating or cooling the culture substrate in which the root system is received. A further embodiment of the system according to the invention has the feature here that a control is provided between the leaf heating means and root temperature control means which imposes a mutual dependence on the leaf temperature and the root temperature. In for instance a normal growth trajectory the leaf temperature will thus follow, optionally in directly proportional manner, a change in root temperature so that the assimilation management keeps pace with a variation in the root pressure.

In order to achieve the stated object, a method has the feature according to the invention that a carbon dioxide assimilation management of a leaf system of the plant is also influenced, and that a supply of actinic light, the root temperature and the carbon dioxide assimilation management are adapted to each other. This method is in line with the above described insight that the root temperature, the supplied light spectrum and the carbon dioxide assimilation management of the leaf are not separate entities but will only arrive at the optimal result in mutual relation. The method according to the invention provides the option of arranging this mutual relation in the form of for instance a plant-dependent and/or growth phase-dependent modification of these growth factors.

In a particular embodiment the method according to the invention is characterized in that the carbon dioxide assimilation management is influenced by regulating a leaf temperature of the leaf system so that it differs from an ambient temperature. The above described system according to the invention is highly suitable for an implementation of this method in that the leaf temperature can hereby be regulated so that, if desired, it differs from the environment, in addition to a control of the other stated growth factors. In a further particular embodiment the method according to the invention is characterized here in that the supply of light, the root temperature and the leaf temperature are adapted to each other depending on the plant.

For the purpose of an optimal photosynthesis and mode of growth of the plant, a further particular embodiment of the method according to the invention has the feature that actinic artificial light is supplied with a spectrum adapted to an intended photosynthesis and/or mode of growth of the plant. By thus specifically adapting the mutual ratio and intensity of the various light components which play a part in the photosynthesis and growth development of the plant, a high yield can nevertheless be realized at a relatively low total light intensity and energy consumption. Within the context of the present invention a further particular embodiment of the method according to the invention has the feature here that the artificial light spectrum, a leaf temperature of the leaf and the root temperature are controlled individually of each other but in mutual relation, depending on the plant.

BRIEF DESCRIPTION OF THE DRAWING FIGURES

The invention will now be further elucidated on the basis of an exemplary embodiment and an accompanying drawing. In the drawing:

FIG. 1 shows a cross-sectional partial view of a device in an exemplary embodiment of a system according to the invention.

The FIGURE is otherwise purely schematic and not drawn to scale. Some dimensions in particular may be exaggerated to greater or lesser extent for the sake of clarity. Corresponding parts are designated as far as possible in the FIGURE with the same reference numeral.

DETAILED DESCRIPTION OF THE INVENTION

The system shown in FIG. 1 makes use of a multi-layer cultivation of plant 1 so as to enable the best possible use of an available surface area. The plant is accommodated here in culture trays 2 with a suitable culture substrate 3 therein, such as earth, glass wool, rockwool or simply water, for the purpose of receiving a root system 4 of the plant therein. Culture trays 2 are placed one above the other on beams 11 of a frame 10 constructed almost entirely from stainless steel. Any desired number of such carriages 10 can thus be combined to form a complete cultivation system in a conditioned environment, wherein the plant is brought to full development in fully controlled manner. Irrigation and fertilizing provisions (not further shown) are arranged at or in carriages 10 in order to provide the plant with sufficient water and the necessary nutrients.

Beams 11 of the carriages each comprise a closed conduit system 12 of a hose or tube which meanders at a regular pitch. In this respect a system of successive hollow fins can optionally also be applied as conduit system. This conduit system 12, through which a heat-carrying medium such as water of a controlled temperature can be guided in order to control a temperature of the root system, forms part of root temperature control means. The heated medium relinquishes heat during operation to for instance the beams, which in turn conduct the heat via the culture trays to the culture substrate with the root system of the plant therein. Conversely, heat can also be extracted from the root bed by means of a cooled heat-carrying medium. The root system is thus kept more or less precisely at a desired root temperature during operation according to the method described here. In order to give this heat transport a more specific control, and thereby a more efficient heat-exchanging capacity, the beams take a multi-layer form with an insulating base 13 of foamed plastic such as polyurethane foam or polystyrene foam, with a reflective top layer 14, for instance a reflective metal coating or an additional intermediate layer provided with such a coating, followed by conduit system 12 and thereon a metal plate 15, for instance of stainless steel, having good thermal conductivity.

Each layer of cultivation system 10 is provided with an artificial light source 20 in the form of a light fitting having therein groups 21 of light-emitting diodes (LEDs), in addition to possible other light sources 22 such as ultraviolet or infrared radiators. The LED diodes in the first groups emit light at least mainly in the visible part of the spectrum, in particular red, yellow, green or blue light, while the second groups 22 add invisible components such as infrared light and near-ultraviolet light thereto. Light fittings 20 are provided with a control (not further shown) with which the different groups and the elements within the groups can be controlled selectively and individually in order during operation to then adapt a specific spectral composition of the emitted light to the requirements and type of the plant 1 being cultivated. Because the beams are optically separated from each other to a significant extent, a different spectrum can if desired thus be supplied per beam in order to thus cultivate different plants in combination with each other and provide each with an optimal spectrum. The system is highly suitable here for application in a low-daylight or even daylight-free environment, such as for instance in an underground situation.

Further provided in the cultivation system are leaf heating means 30 in the form of infrared radiators which are disposed in layers on either side on the shelves of the carriages. The infrared radiators emit direct heat radiation in the direction of the leaf of the plant and thus, if desired, increase a leaf temperature of the leaf relative to the ambient temperature. The carbon dioxide assimilation management of the leaf can thus be controlled to a significant degree and particularly be adapted to the root pressure of the sap flow in the plant which is produced by root system 4. This because heating of the leaf results in a widening of the stomata in the leaf, whereby they will be better able to relieve surplus root pressure by allowing water to evaporate, while a sufficient carbon dioxide assimilation required for the photosynthesis, which is in turn activated and controlled using the lighting means, nevertheless continues via these same stomata. If on the other hand cuttings of the plant are taken, the leaf system is however not heated, or at least heated less, at an increased root simulation so as to thus limit evaporation and ensure an excess of moisture on the cutting surface. All in all, the main growth factors, i.e. the photosynthesis, the root pressure and the carbon dioxide assimilation, can thus be regulated individually in the system according to the invention, and these factors are precisely adapted in mutual relation at each stage of growth and for each plant in order to enhance optimum growth and mode of growth.

Although the invention has been further elucidated above on the basis of only a single exemplary embodiment, it will be apparent that the invention is by no means limited thereto. On the contrary, many other variations and embodiments are possible without requiring a skilled person to depart from the scope of the invention in a manner which is less obvious. The root temperature control means can thus also comprise a conduit system directly in the culture substrate which is in more or less direct heat-exchanging contact with the root system. In the case of cultivation on water or a watery substrate, such as glass wool or rockwool, the root temperature can also be controlled by a controlled control of the temperature of the water supplied thereto.

Use is made in the example of artificial light by means of light-emitting diodes (LEDs), although within the scope of the invention conventional incandescent growing lamps are also suitable instead, and the invention can also be applied in full or partial daylight.

Use is made in the given example of multi-layer cultivation on mobile carriages, although cultivation in a single layer and/or cultivation in a fixed arrangement can also be envisaged within the scope of the invention.

Within the scope of the invention the carbon dioxide assimilation and moisture evaporation via the leaf system can be controlled and adapted to particularly the root pressure. Instead of by means of direct infrared lamps, this can also be achieved by means of spiral filaments, heat panels or the like disposed close to the leaf system. If desired, the leaf heating means, such as the infrared radiators in the example, can further be integrated in the same fitting as the artificial lighting means, for instance for the purpose of saving space and/or ease of installation.

What is really important in the invention is that the growth development of the plant is determined by the weakest link in a chain of the most important growth factors, i.e. photosynthesis, root pressure and carbon dioxide assimilation, and that all these factors are controlled in mutual relation according to the invention and, if desired, are artificially modified in order to realize an optimal chain.

The invention claimed is:

1. A method for producing and harvesting a crop in a daylight-free environment comprising:
   growing the crop in a culture substrate in a multi-layer daylight-free cultivation system having a number of cultivation shelves above one another,
   controlling, in each of said cultivation shelves, a photosynthesis of the crop by controlling a light spectrum supplied to the crop from light emitting diodes,
   controlling, in each of said cultivation shelves, a root temperature of a root system of the crop at a desired value,
   controlling, in each of said cultivation shelves, carbon dioxide assimilation of a leaf system of the crop by controlling a leaf temperature difference of the leaves compared to ambient temperature
   wherein, in each of said cultivation shelves, the control of photosynthesis by controlling the light spectrum, the control of the root temperature, and the control of the carbon dioxide assimilation by controlling a leaf temperature difference of the leaves compared to ambient temperature are adapted:

to one another,
forcing the crop into an intended carbon dioxide assimilation, and
controlling an evaporation of said crop via the leaf by regulating a correct amount of energy on the leaf.

2. The method as claimed in claim 1, wherein the supply of light, the root temperature, and the leaf temperature are adapted to each other depending on the crop.

3. The method as claimed in claim 2, wherein the artificial light spectrum, the leaf temperature of the leaf, and the root temperature are controlled individually of each other but in mutual relation, depending on the crop.

4. The method as claimed in claim 3, wherein a control is provided between a leaf heating means (30) and a root temperature control means (12) which imposes a mutual dependence on the leaf temperature and the root temperature.

5. The method as claimed in claim 1, wherein the leaf temperature of the leaf of the crop is controlled by a leaf heating means (30) that comprise at least one heat source that irradiates the leaf with infrared radiation.

6. The method as claimed in claim 1, wherein the root temperature is controlled by a root temperature control means (12) that comprise a closed conduit system for receiving therein during operation a liquid flow with a controlled temperature, and wherein the conduit system is allowed to enter into heat-exchanging contact with said culture substrate.

7. The method as claimed in claim 1, wherein the leaf temperature is caused to follow a change in root temperature in a directly proportional manner.

\* \* \* \* \*